United States Patent [19]

Akahane et al.

[11] Patent Number: 4,561,034

[45] Date of Patent: Dec. 24, 1985

[54] MAGNETIC RECORDING MEDIUM

[75] Inventors: Naoto Akahane, Takatsuki; Yoshitake Yamaguchi, Nagaokakyo; Takeshi Matsuura, Otokuni; Seiji Watatani, Takatsuki, all of Japan

[73] Assignee: Hitachi Maxell Ltd., Osaka, Japan

[21] Appl. No.: 444,359

[22] Filed: Nov. 23, 1982

[30] Foreign Application Priority Data

Nov. 24, 1981 [JP] Japan .................... 56-188713

[51] Int. Cl.$^4$ ................................ G11B 5/78
[52] U.S. Cl. ........................ 360/134; 428/900
[58] Field of Search ................ 360/134–135; 428/900, 212

[56] References Cited

U.S. PATENT DOCUMENTS

| 4,112,187 | 9/1978 | Asakura et al. | 428/474 |
| 4,187,341 | 2/1980 | Suzuki et al. | 360/134 X |
| 4,316,927 | 2/1982 | Kimura et al. | 360/134 X |
| 4,318,957 | 3/1982 | Videc | 428/295 |

Primary Examiner—John H. Wolff
Attorney, Agent, or Firm—Birch, Stewart, Kolasch & Birch

[57] ABSTRACT

A magnetic recording medium such as a magnetic tape, which comprises a base film, a magnetic layer having an elastic modulus at 1% elongation of not less than 1,200 kg/mm$^2$ totally in both longitudinal and width directions which is higher than that of the base film, said magnetic layer being formed on one surface of the base film, and a backcoat layer having an elastic modulus at 1% elongation of not less than 1,200 kg/mm$^2$ totally in both longitudinal and width directions which is higher than that of the base film, said backcoat layer being formed on another surface of the base film, said magnetic recording medium having a total thickness of not more than 17μ, said magnetic recording medium having excellent mechanical strength and being used without buckle and injury during usage even in a thin thickness.

8 Claims, 1 Drawing Figure

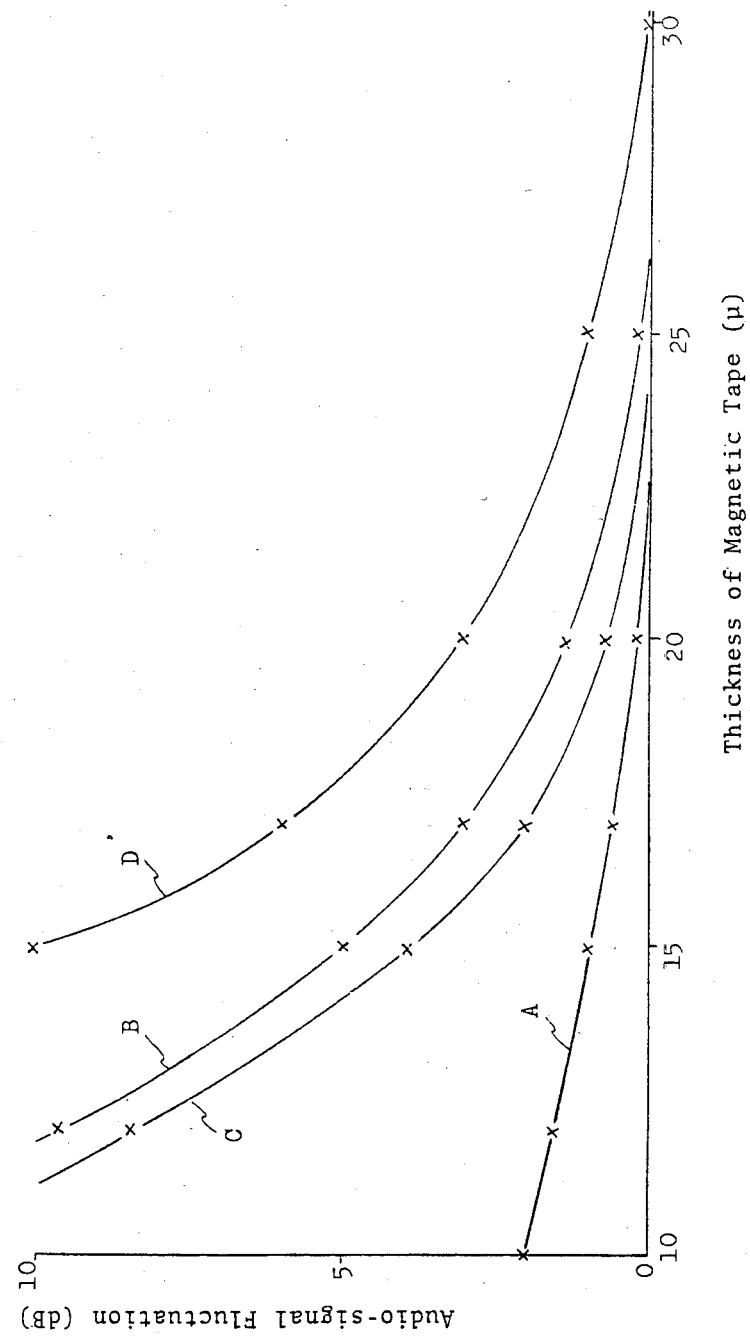

MAGNETIC RECORDING MEDIUM

The present invention relates to a magnetic recording medium such as a magnetic tape, more particularly a magnetic recording medium having a thickness of not more than 17μ and having excellent mechanical strength.

Recently, it has been tried to make the thickness of a magnetic tape, particularly a magnetic tape for video recorder, as thin as possible in order to make the time of recording and reproduction of the tape as long as possible when it is put in a cartridge. However, when the thickness of a magnetic tape is made thin, it results in less mechanical strength thereof, and thereby, the magnetic tape occasionally buckles or is injured by contacting the edge of the tape with a guide for controlling running of the tape or an edge of a loading post for controlling a magnetic tape in case of recording, reproduction, fast feeding, turning back, loading or unloading, and further, it is easily curled or wrinkled.

From this viewpoint, it has been proposed to improve the machanical strength of a magnetic tape by using as a base film a reinforced film obtained by drawing in longitudinal or width direction a plastic film such as polyester film when prepared or by forming a magnetic layer having a high elastic modulus on the base film in addition of the improvement of the base film per se. However, such a device is not yet satisfactory and can not sufficiently prevent the undesirable buckle or injury of the edge of tape when the magnetic tape has a thickness of not more than 17μ.

Aiming at the fact that the mechanical strength of a magnetic tape is affected not only by the magnetic layer but also by the backcoat layer when the backcoating is applied to the base film, the present inventors have studied the relation between the elastic modulus of the backcoat layer and the elastic modulus of the magnetic layer and base film. As a result, it has been found that when the elastic modulus of the backcoat layer and that of the magnetic layer are lower than that of the base film, the mechanical strength of the magnetic tape can not sufficiently be improved, but on the other hand, when the elastic moduli at 1% elongation of both backcoat layer and magnetic layer are made not less than 1,200 kg/mm² totally in both longitudinal and width directions which are both higher than that of the base film, there is obtained a magnetic tape having excellent mechanical strength which is not buckled or injured even if the total thickness of the tape is less than 17μ.

BRIEF SUMMARY OF THE INVENTION

An object of the present invention is to provide an improved magnetic recording medium such as a magnetic tape having an excellent mechanical strength even in a thin thickenss. Another object of the invention is to provide a magnetic recording medium having a thickness of not more than 17μ which is useful for recording or reproduction for a long period of time. These and other objects and advantages of the present invention will be apparent to persons skilled in the art from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows the relationship between the audio-signal fluctuation and the thickness of the magnetic tape.

DETAILED DESCRIPTION OF THE INVENTION

The magnetic recording medium of the present invention comprises a flexible base film made of a high molecular formed product, a magnetic layer having an elastic modulus at 1% elongation of not less than 1,200 kg/mm² totally in both longitudinal and width directions which is higher than that of the base film, said magnetic layer being formed on one surface of the base film, and a backcoat layer having an elastic modulus at 1% elongation of not less than 1,200 kg/mm² totally in both longitudinal and width directions which is higher than that of the base film, said backcoat layer being formed on another surface of the base film, said magnetic recording medium having a total thickness of not more than 17μ.

Formation of the magnetic layer on one surface of the base film is carried out by coating a magnetic composition comprising magnetic particles, a binder, an organic solvent and other additives on the surface of the base film by a conventional coating method such as spray coating or roll coating, followed by drying.

The magnetic particles include conventional magnetic particles such as $\gamma$-$Fe_2O_3$ particles, $Fe_3O_4$ particles, cobalt-containing $\gamma$-$Fe_2O_3$ particles, cobalt-containing $Fe_3O_4$ particles, $CrO_2$ particles, or iron or other metallic magnetic particles. The organic solvent is a solvent suitable for dissolving the binder and includes methyl isobutyl ketone, cyclohexanone, ethyl acetate, tetrahydrofuran, dioxane, toluene, or xylene, which may be used alone or in combination of two or more thereof.

Preferable binder comprises as the main components a comparatively hard, thermoplastic resin such as fibrillar resins, vinyl chloride-vinyl acetate copolymer resins or polyvinyl butyral resin and a thermosetting resin such as epoxy resins which is incorporated with a polyurethane resin and further optionally an isocyanate compound.

In order to improve more the elastic modulus of the magnetic layer, the magnetic composition may be incorporated with an abrasive having a Mohs hardness of 4 to 6 such as $\alpha$-$Fe_2O_3$, $TiO_2$ or talc, and further optionally a lubricating agent, an antistatic agent, or the like.

The magnetic layer thus formed has an elastic modulus at 1% elongation of 450 to 1,200 kg/mm² in longitudinal direction and that of 450 to 1,200 kg/mm² in width direction, totally not less than 1,200 kg/mm², preferably 1,250 to 2,400 kg/mm², in both longitudinal and width directions, which is at least 100 kg/mm² higher than that of the base film. The magnetic layer has preferably a thickness of 0.1 to 6.0μ.

Formation of the backcoat layer is carried out by coating a backcoat composition comprising a binder, an organic solvent, a metal oxide and other additives such as an abrasive on another surface of the base film by a conventional coating method such as spray coating or roll coating, followed by drying.

The binder for the backcoat composition comprises preferably a comparatively hard, thermoplastic resin such as fibrillar resins, vinyl chloride-vinyl acetate copolymer resins or polyvinyl butyral resins and a thermosetting resin such as epoxy resins, which may optionally be incorporated with a polyurethane resin, a nitrile-butadiene copolymer or an isocyanate compound for giving a suitable elasticity thereto. In order to obtain a backcoat layer having an elastic modulus at 1% elongation of not less than 1,200 kg/mm² totally in both longitudinal and width directions and having a suitable elasticity, the polyurethane resin and nitrile-butadiene copolymer may be incorporated in an amount of 25 to 50% by weight based on the total weight of the binder, and the isocyanate compound may be incorporated in an amount of 5 to 40% by weight based on the total weight of the binder.

In addition to the binder, the backcoat composition may preferably be incorporated with an abrasive having a Mohs hardness of 4 to 6 such as $\alpha$-$Fe_2O_3$, $TiO_2$ or talc, by which the backcoat layer shows a more improved elastic modulus and has an elastic modulus at 1% elongation of 1,200 kg/mm² totally in both longitudinal and width directions. When the amount of the abrasive is too small, the elastic modulus is not so improved, and on the other hand, when the amount of the abrasive is too large, the backcoat layer becomes brittle and is easily peeled off. Preferred amount of the abrasive is in the range of 20 to 80% by weight based on the total weight of the backcoat composition. The backcoat composition may also be incorporated with a lubricating agent such as fatty acids and fatty acid esters in order to make the friction coefficient smaller and then improve the stability in travelling and further with carbon black or other conventional additives. The organic solvent includes methyl isobutyl ketone, cyclohexanone, ethyl acetate, tetrahydrofuran, dioxane, toluene, or xylene, which may be used alone or in combination of two or more thereof.

The backcoat layer thus formed has an elastic modulus at 1% elongation of 600 to 1,500 kg/mm² in longitudinal direction and that of 600 to 1,500 kg/mm² in width direction, totally not less than 1,200 kg/mm², preferably 1,300 to 3,000 kg/mm², in both longitudinal and width direction, which is at least 100 kg/mm² higher than that of the base film. The backcoat layer has preferably a thickness of 0.1 to 6.0$\mu$.

The base film is preferably a flexible plastic film made of a conventional high molecular formed product, such as polyesters, polyimides, polyamides, polypropylenes, polycarbonates, or polyethylenes, or a reinforced film of these films which is prepared by drawing them in longitudinal and/or width directions.

The base film has preferably an elastic modulus at 1% elongation of 300 to 800 kg/mm² in longitudinal direction and 300 to 800 kg/mm² in width direction which are not higher than the elastic moduli of the magnetic and backcoat layers, and has preferably a thickness of 5 to 13$\mu$.

The magnetic recording medium such as a magnetic tape of the present invention has a very thin thickness of not more than 17$\mu$, usually 6 to 17$\mu$, preferably 6 to 16$\mu$ and has still an excellent mechanical strength, and hence, is useful for recording and reproduction for a long period of time without defects such as buckle and injury during usage thereof.

The present invention is illustrated by the following Examples, but is not construed to be limited thereto.

EXAMPLE 1

Polyester base films having an elastic modulus of 750 kg/mm² in longitudinal direction and an elastic modulus of 350 kg/mm² in width direction which have various thicknesses are used. The following magnetic composition is coated on one surface of the base films in a thickness of 4$\mu$ (in dry state) and dried to form a magnetic layer. The following backcoat composition is coated on another surface of the base films in a thickness of 1$\mu$ (in dry state) and dried to form a backcoat layer. The resulting coated films are cut in a prescribed width to give magnetic tapes which have various thicknesses.

The magnetic layer of the magnetic tapes thus obtained each has an elastic modulus of 800 kg/mm² in longitudinal direction and an elastic modulus of 500 kg/mm² in width direction, totally 1,300 kg/mm² in both directions. The backcoat layer of the magnetic tapes each has an elastic modulus of 700 kg/mm² in width direction, totally 1,350 kg/mm² in both directions.

| Magnetic composition | |
| --- | --- |
| Co-containing acicular $\gamma$-$Fe_2O_3$ particles | 100 parts by weight |
| Carbon black | 4 parts by weight |
| Nitrocellulose | 10 parts by weight |
| Polyurethane resin | 9 parts by weight |
| Desmodule L (isocyanate compound, manufactured by Bayer) | 3.5 parts by weight |
| n-Butyl stearate | 0.5 parts by weight |
| Myristic acid | 0.5 parts by weight |
| Cyclohexanone | 95 parts by weight |
| Toluene | 95 parts by weight |

| Backcoat composition | |
| --- | --- |
| Acicular $\alpha$-$Fe_2O_3$ particles | 75 parts by weight |
| Cabon black | 15 parts by weight |
| Nitrocellulose | 50 parts by weight |
| Polyurethane resin | 35 parts by weight |
| Desmodule L | 15 parts by weight |
| Myristic acid | 0.5 parts by weight |
| n-Butyl stearate | 0.5 parts by weight |
| Cyclohexanone | 230 parts by weight |
| Toluene | 230 parts by weight |

REFERENCE EXAMPLE 1

Magnetic tapes having various thicknesses are prepared in the same manner as described in Example 1 except that the following backcoat composition is used instead of the backcoat composition in Example 1.

The magnetic layer of the magnetic tapes thus obtained each has the same elastic modulus as that in Example 1, and the backcoat layer of the magnetic tapes each has an elastic modulus of 600 kg/mm² in longitudinal direction and an elastic modulus of 450 kg/mm² in width direction, totally 1,050 kg/mm² in both directions.

| Backcoat composition | |
| --- | --- |
| Carbon black | 100 parts by weight |
| Urethane rubber prepolymer | 60 parts by weight |
| Colonate L (isocyanate compound, manufactured by Nippon Urethane Kogyo K.K.) | 18 parts by weight |
| Silicone oil | 0.5 parts by weight |
| Methyl ethyl ketone | 256 parts by weight |
| Toluene | 64 parts by weight |

REFERENCE EXAMPLE 2

Magnetic tapes having various thicknesses are prepared in the same manner as described in Example 1 except that no backcoat layer is formed and the magnetic layer is formed in a thickness of 5μ (in dry state). The magnetic layer of the magnetic tapes thus obtained each has the same elastic modulus as that in Example 1.

REFERENCE EXAMPLE 3

Magnetic tapes having various thicknesses are prepared in the same manner as described in Example 1 except that no backcoat layer is formed and the magnetic composition is modified by replacing nitrocellulose (10 parts by weight) by a vinyl chloride-vinyl acetate-vinyl alcohol copolymer (VAGH, manufactured by U.C.C. in U.S.A., 12 parts by weight), replacing polyurethane resin (9 parts by weight) by a urethane prepolymer (Takenate, manufactured by Takeda Chemical, 8 parts by weight) and changing the amount of desmodule L from 3.5 parts by weight to 2.5 parts by weight, and further the magnetic layer is formed in a thickness of 5μ (in dry state). The magnetic layer of the magnetic tapes thus obtained each has an elastic modulus of 650 kg/mm² in longitudinal direction and an elastic modulus of 350 kg/mm² in width direction, totally 1,000 kg/mm² in both directions.

In order to measure the mechanical strength of each magnetic tape obtained in the above Example 1 and Reference Examples, audio-signal flucuation of the tape was measured and then relation between the audio-signal fluctuation and the thickness of tape was determined.

The audio-signal fluctuation was measured as follows.

Magnetic tapes having various thicknesses were each put in a video tape recorder in VHS system and were travelled until about 10 m in length before the end of the tape and then stopped. At this stage, the tape was repeatedly (5 times) subjected to loading and unloading against a revolving cylinder head, and then the audio signal was measured at a recording signal of 1 KHz with a reproducing VTR. The audio-signal fluctuation (dB) was shown by the difference between the maximum value and the minimum value of the output power in reproduction. When the audio-signal fluctuation is larger, the mechanical strength of the tape is smaller. Limit for use of the magnetic tape without occurrence of buckle and injury is 2 dB or less.

The accompanying FIG. 1 shows the relation between the audio-signal fluctuation and the thickness of magnetic tape, wherein A is the relation in the magnetic tape obtained in Example 1, and B, C and D are those in the magnetic tapes obtained in Reference Examples 1, 2 and 3, respectively.

As is clear from these graphs, the magnetic tape obtained in Reference Example 3 (graph D) and that of Reference Example 2 (graph C) show an audio-signal fluctuation of more than 2 dB in a thickness of tape of 22μ or less and 17μ or less, respectively, which means that when the elastic modulus of the magnetic layer formed on the base film is lower than that of the base film (as in case of graph D), the thickness of the tape must be more than 22μ for exhibiting the desired mechanical strength, and on the other hand, when the elastic modulus of the magnetic layer is higher than that of the base film (as in case of graph C), the mechanical strength of the magnetic tape is largely improved but is still lower in a thickness of less than 17μ and hence the undesirable buckle and injury at the edge of tape are not effectively prevented. Besides, the magnetic tape obtained in Reference Example 1 (graph B) shows an audio-signal fluctuation of 2 dB at a 2 dB at a thickness of less than 18.5μ, and on the other hand, the magnetic tape obtained in Example 1 (graph A) shows an audio-signal fluctuation of 2 dB at a thickness of 10μ, which means that when the elastic modulus of the magnetic layer is higher than that of the base film and further a conventional backcoat layer having an elastic modulus lower than that of the base film is formed (as in case of graph B), the magnetic tape shows rather a mechanical strength lower than that of the magnetic tape obtained in Reference Example 2, but when the elastic moduli of both magnetic layer and backcoat layer are higher than the elastic modulus of the base film and the elastic modulus at 1% elongation is not less than 1,200 kg/mm² totally in both longitudinal and width directions as in the magnetic tape of the present invention (graph A), it shows further improved mechanical strength and hence the buckle and injury of the edge of tape are sufficiently prevented even at a thickness of lower than 17μ but not lower than 10μ.

EXAMPLE 2

By using the same polyester base film (thickness: 10μ) as used in Example 1, a magnetic tape is prepared in the same manner as described in Example 1 except that nitrocellulose in the magnetic composition is replaced by the same amount of VAGH and nitrocellulose in the backcoat composition is replaced by the same amount of VAGH.

The magnetic layer of the magnetic tape thus obtained shows an elastic modulus at 1% elongation of 700 kg/mm² in longitudinal direction and that of 550 kg/mm² in width direction, totally 1,250 kg/mm² in both directions. Besides, the backcoat layer of the magnetic tape shows an elastic modulus at 1% elongation of 700 kg/mm² in longitudinal direction and that of 600 kg/mm² in width direction, totally 1,300 kg/mm² in both directions.

EXAMPLE 3

By using the same polyester base film (thickness: 10μ) as used in Example 1, a magnetic tape (thickness: 15μ) is prepared in the same manner as described in Example 1 except that nitrocellulose in the magnetic composition is replaced by the same amount of a polyvinyl butyral resin (Esreck BLS, manufactured by Sekisui Kagaku Kogyo K.K.) and nitrocellulose in the backcoat composition is replaced by the same amount of Esreck BLS.

The magnetic layer of the magnetic tape thus obtained shows an elastic modulus at 1% elongation of 850 kg/mm² in longitudinal direction and that of 400 kg/mm² in width direction, totally 1,250 kg/mm² in both directions. Besides, the backcoat layer of the magnetic tape shows an elastic modulus at 1% elongation of 650 kg/mm² in longitudinal direction and that of 550 kg/mm² in width direction, totally 1,200 kg/mm² in both directions.

The audio-signal fluctuation of the magnetic tapes obtained in Examples 2 and 3 was measured in the same manner as in Example 1 and Reference Examples 1 to 3. The results are shown in the following table.

TABLE

| | Elastic modulus at 1% elongation (kg/mm²) | | | | | | | | | Audio-signal |
|---|---|---|---|---|---|---|---|---|---|---|
| | Base film | | | Magnetic layer | | | Backcoat layer | | | fluctuation |
| Ex. No. | Long. direct. | Width direct. | Total | Long. direct. | Width direct. | Total | Long. direct. | Width direct. | Total | (dB) |
| Ex. 2 | 750 | 350 | 1100 | 700 | 550 | 1250 | 700 | 600 | 1300 | 1.2 |
| Ex. 3 | 750 | 350 | 1100 | 850 | 400 | 1250 | 650 | 550 | 1200 | 1.3 |

As is clear from the above table, the magnetic tapes obtained by Examples 2 and 3 show extremely small audio-signal fluctuation at a thickness of 15μ, which means that the magnetic recording medium obtained by the present invention shows excellent mechanical strength at a total thickness of not more than 17μ.

What is claimed is:

1. A magnetic recording medium which comprises a base film, a magnetic layer having an elastic modulus at 1% elongation of not less than 1,200 kg/mm² totally in both longitudinal and width directions which is higher than that of the base film, said magnetic layer being formed on one surface of the base film, and a backcoat layer having an elastic modulus at 1% elongation of not less than 1,200 kg/mm² totally in both longitudinal and width directions which is higher than that of the base film, said backcoat layer being formed on another surface of the base film, said magnetic recording medium having a total thickness of not more than 17μ.

2. A magnetic recording medium according to claim 1, wherein both of the magnetic layer and the backcoat layer have an elastic modulus at 1% elongation in total in both longitudinal and width directions of at least 100 kg/mm² higher than that of the base film.

3. A magnetic recording medium according to claim 2, wherein the magnetic layer has a total elastic modulus at 1% elongation of 1250 to 2400 kg/mm², and the backcoat layer has a total elastic modulus at 1% elongation of 1300 to 3000 kg/mm².

4. A magnetic recording medium according to claim 3, wherein the magnetic layer has a thickness of 0.1 to 0.6μ, the backcoat layer has a thickness of 0.1 to 6.0μ, and the base film has a thickness of 5 to 13μ.

5. A magnetic recording medium according to claim 2, wherein the magnetic layer has an elastic modulus at 1% elongation of 450 to 1200 kg/mm² in longitudinal direction and that of 450 to 1200 kg/mm² in width direction, and the backcoat layer has an elastic modulus at 1% elongation of 600 to 1500 kg/mm² in longitudinal direction and that of 600 to 1500 kg/mm² in width direction, and the base film has an elastic modulus at 1% elongation of 300 to 800 kg/mm² in longitudinal direction and that of 300 to 800 kg/mm² in width direction.

6. A magnetic recording medium according to claim 2, wherein the magnetic layer has an elastic modulus at 1% elongation of 450 to 1200 kg/mm² in longitudinal direction and that of 450 to 1200 kg/mm² in width direction and a thickness of 0.1 to 6.0μ, and the backcoat layer has an elastic modulus at 1% elongation of 600 to 1500 kg/mm² in longitudinal direction and that of 600 to 1500 kg/mm² in width direction and a thickness of 0.1 to 6.0μ, and the base film has an elastic modulus at 1% elongation of 300 to 800 kg/mm² in longitudinal and that of 300 to 800 kg/mm² in width direction and a thickness of 5 to 13μ.

7. A magnetic recording medium according to claim 1, wherein the magnetic layer and the backcoat layer both have a Mohs hardness of 4 to 6.

8. A magnetic recording medium according to claim 1, wherein the thickness of the magnetic recording medium is in the range of 6 to 17μ.

* * * * *